United States Patent
Takahashi et al.

[11] Patent Number: 6,145,065
[45] Date of Patent: Nov. 7, 2000

[54] MEMORY ACCESS BUFFER AND REORDERING APPARATUS USING PRIORITIES

[75] Inventors: Satoshi Takahashi; Hiroyuki Yamauchi; Hironori Akamatsu, all of Osaka; Keiichi Kusumoto, Hyougo; Toru Iwata, Osaka; Yutaka Terada, Osaka; Takashi Hirata, Osaka, all of Japan

[73] Assignee: Matsushita Electric Industrial Co., Ltd., Osaka, Japan

[21] Appl. No.: 09/067,899

[22] Filed: Apr. 29, 1998

[30] Foreign Application Priority Data

May 2, 1997 [JP] Japan ..................................... 9-114857

[51] Int. Cl.[7] ....................................................... G06F 12/02
[52] U.S. Cl. ................................. 711/158; 711/5; 711/105
[58] Field of Search ................................ 711/5, 105, 157, 711/158, 167

[56] References Cited

U.S. PATENT DOCUMENTS

| | | |
|---|---|---|
| 5,375,215 | 12/1994 | Hanawa et al. . |
| 5,638,534 | 6/1997 | Mote, Jr. ................................. 395/485 |
| 5,666,494 | 9/1997 | Mote, Jr. ................................. 711/167 |
| 6,058,461 | 5/2000 | Lewchuk et al. ........................ 711/158 |

FOREIGN PATENT DOCUMENTS

| | | |
|---|---|---|
| 58-225432 | 12/1983 | Japan . |
| 4175943 | 6/1992 | Japan . |
| 955081 | 2/1997 | Japan . |

OTHER PUBLICATIONS

Japanese Search Report dated Sep. 1, 1998 in English and Japanese.

Kazushige Ayukawa, et al., "An Access–sequence Control Scheme to Enhance Random Access Performance of Embedded DRAMs," 1997 Symposium on VLSI Circuits Digest of Technical Papers, pp. 59–60.

*Primary Examiner*—Do Hyun Yoo
*Assistant Examiner*—Kevin Verbrugge
*Attorney, Agent, or Firm*—Stevens, Davis, Miller & Mosher, L.L.P.

[57] ABSTRACT

A current problem is that when a DRAM is to be accessed through a data bus, the DRAM is accessed independently of a bank, a row address, etc., and therefore, is inefficient. To solve this problem, an address bus and a data bus are connected to a main memory part independently of each other, a temporary memory part for holding a plurality of addresses in advance is disposed on the address bus side and holds addresses for every access to the main memory part regardless of transfer of data, thereby pipelining address inputting cycles. Further, for the purpose of an effective operation of the main memory part, using the addresses which are held, the addresses are rearranged in such a manner that addresses with the same row addresses become continuous to each other, or when there are not addresses with the same row addresses, addresses different banks from each other become continuous to each other, and the memory is thereafter accessed. This reduces the number of precharges, shortens a standby period which is necessary for a precharge, and realizes accessing while reducing a wasteful use of time.

10 Claims, 6 Drawing Sheets

MEMORY ACCESS BUFFER AND REORDERING APPARATUS USING PRIORITIES

BACKGROUND OF THE INVENTION

Field of the Invention

The present invention relates to a multiple address holding memory apparatus which is shared by a plurality of processes or a plurality of processors, and more particularly, to a multiple address holding memory apparatus in which when data are to be stored in or read from a main memory part through random accessing, addresses at which the main memory part is to be accessed are held in advance for the purpose of efficient accessing and an order of addresses is permuted for the purpose of efficient accessing.

Description of the Background Art

Where a plurality of processes or a plurality of processors share one dynamic random access memory (hereinafter referred to as a "DRAM"), when the DRAM is to be accessed, in order to shorten an access time of accessing the DRAM, a main memory part may be internally formed as a multi bank system as customarily done in a synchronous DRAM, for example, so that an apparent access time is reduced by accessing while switching banks.

Among memory systems having such a multi bank system, and particularly among those which allow to access through an address bus and a data bus independently of each other, some memory systems adopt a method which requires accumulating addresses in an FIFO memory and supplying addresses from the FIFO memory to memory means in the input order so that it is not necessary to wait for a previous access to complete when an address bus is to be accessed. Such a memory system is disclosed in Japanese Patent Application Laid-Open Gazette No. 4-175943.

However, since a conventional memory system as described above requires accumulating addresses in an FIFO memory, information accumulated in the FIFO memory can not be retrieved in an order but for an access order in which processes or processors accessed, and therefore, address information stored in the FIFO memory an control information which is used for accessing memory means cannot be retrieved unless in the access order. This makes it impossible to re-arrange access priority ranks considering an address structured, a bank structure and the like of the memory means of the memory system which is accessed by the processes or processors and considering priority ranks of the processes or processors for accessing the memory system, for the purpose of optimum accessing, or in order words, for the purpose of accessing in such an order which minimizes an access time.

Now, an optimum access order will be described. For example, when data of different banks from each other are to be accessed continuously, it is not necessary to precharge between access of continuous data. Meanwhile, even when data of the same bank are to be accessed continuously, if data whose row addresses are the same but column addressed alone are different are to be accessed continuously, it is not necessary to precharge between accesses of continuous data in that bank.

From the above, it is considered that a reduction in an access time is possible, if an access order for accessing addresses which are planned to be accessed is changed in such a manner that addresses of different banks become continuous to each other or addresses with the same row addresses with each other become continuous to each other in the same bank, and consequently, as few precharge cycles as possible are inserted between accesses of continuous data.

However, if an access order for accessing addressed which are planned to be accessed is configured so as to be chargeable in so simple a manner that addresses of different banks are arranged continuous to each other or addresses whose row addresses are the same in the same bank are arranged continuous to each other, under a condition where a plurality of processes or a plurality of processors access without any break, this configuration may permit only a particular process or processor to access data but may delay accesses by other processes or processors until later, which in turn stagnates the other processes or processing at the other processors. Describing the reason, in a process or processor for processing an image or the like, data whose row addresses are the same in the same bank but whose column addresses alone are different are often accessed continuously. In such a case, even if an access to an address of a different bank or a different row address by other process or processor is inserted, the inserted access is deferred until later because of a change in the access order in accordance with the condition described above.

Further, if an access order for accessing addresses is changed simply to shorten an access time, chances are that certain accesses will be always delayed until later. This occurs when accesses which are added later are always preferable to shorten an access time. This can be avoided if priority ranks are set for accesses, a priority rank for an access which was delayed repeatedly is advanced and an access with a certain or higher priority rank is allowed unconditionally.

SUMMARY OF THE INVENTION

An object of the present invention is to provide a multiple address holding memory apparatus in which a plurality of processes or a plurality of processors share a main memory part and which shortens an overall access time.

Other object of the present invention is to provide a multiple address holding memory apparatus which prevents a situation that an access of a certain process or processor among a plurality of processes or processors is delayed until late and the delayed process or processing at the processor becomes stagnant.

According to the present invention, an address temporary memory part stores addresses which are inputted sequentially or simultaneously, a permutation part permutes an order of the addresses which are stored in the address temporary memory part in such a manner that an overall access time is reduced, and the stored addresses are read out at a speed which corresponds to operations of a main memory part, whereby access cycles which are necessary between the main memory part and processes or processors are reduced, and therefore, an overall access time to the main memory part is shortened. To re-arrange the addresses in such a manner to reduce an overall access time, that is, to speed up accesses, reefers to permute in such a manner that addresses having the same row addresses are accessed continuously, and particularly in the case that the main memory part has a multi bank system, to permute in such a manner that addresses of different banks are accessed continuously if there are not addresses having the same row addresses. Such permutation avoids a precharge between accessing to a certain address and accessing to next address or reduces a standby period for a precharge, which in turn shortens an overall access time. Where priority ranks are assigned in a certain order to accesses from a plurality or processes or processors and a higher priority is given to this priority ranks then such permutation of addresses as described above which aims at speeding up accessing, if the priority ranks for the plurality of processes or processors are set appropriately, it is possible to prevent a change in the order of the addresses from continuously delaying, and hence, stagnating an access of the main memory part from a particular process or processor.

More specifically, a multiple address holding memory apparatus according to the present invention is of transferring data with a plurality of processes or processors, and therefore, is shared by the plurality of processes or processors. The multiple address holding memory apparatus is formed by the main memory part, an address bus, a data bus, the address temporary memory part, and the permutation part.

Supplied to the address bus are addresses for accessing of the main memory part from the plurality of processes or processors, and control signals for controlling the main memory part. Meanwhile, the data bus operates independently of the address bus to transfer data between the plurality of processes or processors and the main memory part. The address temporary memory part, disposed at an address input terminal of the main memory part, holds a plurality of addresses which are inputted through the address bus and a plurality of control signals which correspond to the plurality of addresses, and supplies the addresses which are held therein to the main memory part sequentially while supplying the control signals to the main memory part. The permutation part permutes into such an order which realizes high-speed accessing regardless of an order in which the main memory part was accessed, so that the address temporary memory part supplies the addresses and the control signals to the main memory part.

Since the address temporary memory part supplies the addresses to the main memory part after the permutation part re-arrange the addresses, accesses at a high speed are possible. That is, as the address temporary memory part which is capable of storing addresses sequentially is disposed, cycles for inputting addresses are pipelined and the pipelined cycles served as a buffer against bus accesses. Hence, even when discontinuous accesses are attempted or simultaneous accesses are attempted, the multiple address holding memory apparatus deals with the accesses successively. The accesses are allowed after such permutation which realizes effective accessing to the main memory part, and therefore, it is possible to eliminate a wasteful access cycle and shorten an access time.

The address bus and the data bus need to operate independently of each other, that is, to be independent of each other with respect to operations, for the purpose of pipelining of address input cycles. As herein termed, being independent of each other with respect to operations covers not only a structure that the address bus and the data bus are formed by separate wires but also a structure that the address bus and the data bus operate in a time sharing manner and hence can be viewed as operationally independent of each other even though the address bus and the data are realized by the same wire. A time sharing operation mentioned above is a mode in which only address information is transmitted during a period in which a single common bus is used as an address bus but only data information is transmitted during a period in which the single common bus is used as a data bus.

Now, a relationship between permutation of an order of accessing a memory and the independence of the address bus and the data bus will be described. A single which is used for accessing of the main memory part from a processor or the like through the address bus contains address information for accessing inside the main memory part, control information which is indicative of read from and write to the main memory part, priority rank information regarding priority ranks of accesses, and control numbers which indicate which processor attempts to access.

When a condition is met for a processor to access the address temporary memory part, that is, when there is a space in the address temporary memory part and a priority rank of this processor is higher than that of other processor attempting an access at the same time, this processor is allowed to successively write in the address temporary memory part. This prevents a situation that next access is prohibited until a cycle for the address bus during a processor access completes.

At this stage, if the address bus and the data bus are not independent of each other, or where the address bus and the data bus are the same bus, if this bus is not time-shared appropriately, accessing of address information, control information of the like is kept waiting while data are transferred. Noting this, the present invention requires that the address bus and the data bus are operationally independent of each other so as to allow accessing of address information, control information or the like even during transfer of data.

Next, a wasteful access cycle will be described. There are three types of wasteful access cycles. When the main memory part is to be accessed for the purpose of reading or writing, an access is attempted with control information such as read and write and address information attached. A time lag is created in a circuit which is disposed within the main memory part because of turning on of an address in a storage region of the main memory part, selection of data, etc., since such information as above is supplied to the main memory part until data are written or read. This is the first type of wasteful access cycles.

Two type of addresses of row addresses and column addresses are supplied in this order to a regular DRAM, and data are written in or read from one position in a storage region. However, a reset period called a precharge is necessary between a certain access and the next access. Yet, such a reset period is not necessary when row addresses are the same. Describing the reason, a row address is supplied at first followed by inputting of a column address. Upon input of a row address, all of storage regions which are connected to the input row address are turned on. When a column address is inputted, one position in the ON storage regions is designated and data are read or written. Hence, even if a column address is different, the ON storage regions can be accessed without a time lag of turning on. However, when an attempted access to the main memory part at a different row address is planned between attempted accesses to the main memory part at the same row addresses, since the initial row address and the next row address are different from each other, a reset period called a precharge is necessary. Since the row address changes subsequently in proceeding to the following access, a rest period is necessary again, In such a manner, a precharge, occurs, and hence, a time lag is created as an attempted accesses at the same row addresses. This is the second type of wasteful access cycles.

A DRAM which has a multi bank structure is also similar in the two points described immediately above with respect to accessing to each bank, but has a different advantage. That is, a reset period called a precharge, which has been described above as the second type of wasteful access cycles, is a period. in which resetting is executed after accessing at a certain row address and before turning on a storage region at a different row address. However, in a multi bank system, even during such a reset period, since a bank which is different from a bank which is being reset is already precharged, a storage region at a different row address can be turned on, in which case there is only a time lag of inputting a row address and turning on a storage region but there is not time lag due to a reset period. In other words, when there are three accesses to the main memory part at different row addresses attempted continuously and further when the first and the second accesses are to the same bank and the last access alone is to a different bank, if the main memory part is accessed in this order, a reset period is necessary between the first access and the second access. This is the third type of wasteful access cycles.

Where the control signals which are stored in the temporary memory part contain the priority rank information regarding accesses, the permutation part may permute in accordance with the access priority ranks so that a high priority is given to the permutation in accordance with the access priority ranks than permutation in accordance with an order which aims at speeding up accessing. An order which aims at speeding up accessing described above is, for example, an order in which accesses at addresses with the same row addresses are continuous to each other, and particularly in the case where the main memory part has a multi bank system, an order in which accesses at addresses in different banks are continuous to each other.

For example, described as below is processing at the permutation part to place a higher priority to permutation in accordance with access priority ranks than permutation in accordance with an order which realizes high-speed accessing. That is, accessing is started with an access having the highest priority rank placed as the earliest access. Where there are a currently allowed access and an attempted access at the same row address, if a priority rank assigned to another attempted access at a different row address is the same or lower than the attempted access at the same row address, the attempted access at the same row address is re-arranged to be allowed earlier and is then started. Meanwhile, where there are a currently allowed access and an attempted access in a different bank, if a priority rank assigned to another attempted access in the same bank is the same or lower than the attempted access in the different bank, the attempted access in the different bank is re-arranged to be allowed earlier and is then started. With respect to addresses and control signals which are stored in the temporary memory means, while the control signals contain the priority rank information and the control information regarding whether to write in the main memory part or read from the main memory part, the priority rank information defines the priority ranks described above.

When permutation is performed considering priority ranks assigned to accesses and determining an order as described above, it is possible to execute an important access having a higher priority rank even through accessing may become slow. Further, it is possible to prevent a certain process or processor among a plurality of processes or processors from delayed until later, and hence, to avoid the process or processing at the processor from becoming stagnant.

Now, a relationship between priority ranks assigned to accesses, an important access, and a plurality of processes or processors will be described. Priorities are used in two ways. First, priority ranks are used to determine which access is to be allowed first when there are two or more accesses attempted at the same time from processes or processors. The priority ranks are included in the control signals in advance. The information regarding the priority ranks clearly shows in which order accesses are to be stored in the temporary memory means even through those accesses are attempted simultaneously.

Second, priority ranks are used as one of information which is used at the permutation for determining permutation. More specifically, the priority ranks are stored in the temporary memory means as a part of the information which is contained in control signals, so that the permutation part places an access having the highest priority to the top and the access is thereafter started. Where there are a currently allowed access and an attempted access at the same row address, if a priority rank assigned to another attempted access at a different row address is the same or lower than the attempted access at the same row address, the attempted access at the same row address is re-arranged to be allowed earlier and is then started, whereas where there are a currently allowed access and an attempted access to a different bank, if a priority rank assigned to another attempted access to the same bank is the same or lower than the attempted access to the different bank, the attempted access to the different bank is re-arranged to be allowed earliest and is then started, whereby permutation is determined. Priority ranks are used as one of information at this stage of permutation.

However, where permutation in accordance with access priority ranks is not adopted or priority ranks are fixed, if permutation is executed so that accesses to addresses having the same row addresses are continuous to each other or accesses to addresses in different banks are continuous to each other, the following phenomena occurs in the case that address/control signal pairs which are newly written to the temporary memory means consecutively by the plurality of processes or processors indicate the same row address with a currently allowed access or a different bank from the currently allowed access. That is, every time an access to the same row address with a currently allowed access but to a different bank from the currently allowed access is newly written to the temporary memory means, an old address/control signal pair which was written by a process or processors which attempts to access to an address with a different row address from the currently allowed access but of the same bank with the currently allowed access is passed over. Hence, if accesses indicating the same row address with but different banks from the currently allowed access are kept newly written to the temporary memory means one after another, a process or processor which attempts to access to an address with a different row address but of the same bank with the currently allowed access is delayed until later endlessly.

To deal with this, every time old address/control signal pair is passed over, the permutation part advances a priority rank which is information contained in the control signal of the old address/control signal pair. As the permutation part performs such an operation of permutation considering a priority rank as well in addition to a row address and a bank, even if accesses to the same row addresses with a currently allowed access are newly written to the temporary memory means by the plurality of processes or processors as new address/control signal pairs, when the advanced priority rank of the old address/control signal pair is higher, accessing corresponding to the old address/control signal pair is allowed earlier even at the sacrifice of the efficiency and the speed of the accessing.

As the permutation part manipulates priority ranks every time an old address/control signal pair is passed over in this manner, an address/control signal pair corresponding to a newly attempted access from the processes or processors which aims at the same row address with or a different bank from a currently allowed access is written to the temporary memory means, thereby preventing a process or processing at a processor which wrote an address/control signal pair indicating a different row address but the same bank with the currently allowed access, and hence, is always passed over from stagnating permanently. In short, as permutation considering priority ranks is possible, permutation in accordance with a row address, information regarding a bank, etc., for instance, makes it possible to move up a priority rank which is assigned to the address/control signal pair which will be otherwise passed over, and hence, a design eliminating a control which will never be executed forever is possible. Processing which is permanently stagnant is a newly attempted access from a process or processor, namely, a process or processing at a processor which wrote an address/control signal pair indicating a different row address but the same bank and therefore is always passed over as address/control signal pairs which correspond to accesses aiming at the same row addresses or different banks are written to the temporary memory means.

Further, positively utilizing the priority rank information which is contained in the control signals, when a certain process or processor attempts an access to speech data, image data or the like which require real time accessing which bears a greater importance than other accesses which do not require a real time operation, a priority rank to this important access can be set high from the beginning. Hence, the permutation part can perform permutation considering priority ranks as well, and therefore, it is possible to start this important access without waiting for the other accesses.

The temporary memory means described above temporarily stores addresses at which the main memory part is to be accessed and the control signals. The control signals contain the priority rank information and the control information for controlling whether to write in the main memory part or read from the main memory part. As the main memory part is accessed with the addresses and the control signals containing the control information described above used as pairs, specific addresses in the main memory part are accessed to write data or read data. To this end, it is necessary that the addresses and the control signals are paired to each other. The temporary memory means stores more than one pairs of the addresses and the control signals (hereinafter referred to as address/control signal pairs).

Further, the permutation part is formed by an order deciding part which decides an order of addresses in the temporary memory means based on the information which is contained in the address/control signal pairs which are stored at the respective addresses in the temporary memory means, for example, a stored order replacing part which stores an order which is determined by the order deciding part, and an output address generation part which supplies an output address for reading data to the temporary memory means in accordance with contents of the stored order replacing part.

Among the addresses and the control signals which are stored in the temporary memory means described above, information regarding the addresses are address information which indicates addresses at which the main memory part is to be accessed and bank information which indicates banks at which the main memory part is to be accessed (only in the case that the main memory part has a multi bank system). In addition, the information contained in the control signals are, for example, empty flags which indicate that there are empty addresses in the temporary memory means, the priority rank information which indicates priority ranks which are assigned to accesses from the processes or processors, read/write information which indicates whether to read from the main memory part or write in the main memory part, and control numbers which indicate numbers which specify the processor (or the control signals)

The order deciding part determines an order of the addresses and the control signals using the priority rank information, the address information and the bank information, the stored order replacing part stores the order, and during accessing through the data bus, the processes or processors are specified by means of the control numbers and a write operation and a read operation are executed. Meanwhile, an empty address search part searches for an empty address in the temporary memory means based on the empty flags.

The empty flags described above, the priority rank information, the read/write information and the control numbers are a part of the information which is contained in the control signals of the address/control signal pairs. On the other hand, the address information and the bank information are a part of the information which is contained in the addresses of the address/control signal pairs. Now, each information will be described below in detail.

When the empty address search part searches for an empty address in the temporary memory means, the empty flags are used as a part of the information which is contained in the control signals of the address/control signal pairs, in order to search for an empty address in the temporary memory means. There are a plurality of regions in the temporary memory means to store the address/control signal pairs. An empty flag is attached to each region for storing each address/control signal pair, to indicate whether the corresponding region for storing the corresponding address/control signal pair is empty. Upon writing of the address/control signal pairs in the respective regions, the corresponding empty flags indicate that the regions are not empty. Now, assuming that tan empty flag of a high level indicates that the region is not empty and an empty flag or a low level indicates that the region is empty, when the address/control signal pairs are written, the empty flags are at the high level. As the address/control signal pairs are used to access the main memory part and read out, the empty flags change to the low level from the high level. It is the empty address search part that searches for a region in which the empty flag is at the low level.

The control numbers are a part of the information which is contained in the control signals of the address/control signal pairs, and used in two manners. In the first manner, in the case that more than one address/control signal pairs are written in the temporary memory means, the control numbers are used as numbers which correspond to the address/control signal pairs which are supplied to the stored order replacing part after the order deciding part controlled permutation. In this case, since the control numbers correspond to the address/control signal pairs, the control numbers are used to recognize the address/control signal pairs. In the second manner, when data are to be written in or read from the main memory pat in response to the address/control signal pairs which were written by more than one processes or processors, the control numbers are used to specify which ones the processes or processors are and allow particular processes or processors to access through the data bus.

The priority rank information is a part of the information which is contained in the control signals of the address/ control signal pairs. After initially used at a priority rank deciding part, the priority rank information is utilized to have the address/control signal pairs accepted in the order of the priority ranks. In addition, the priority rank information is utilized for the order deciding part to replace the order using the priority rank information described later.

The read/write information is a part of the information which is contained in the control signals of the address/control signal pairs, and describes whether to read data from the main memory part of write data in the main memory part. The read/write information is used at a control signal timing generation part to determine accesses to the main memory part, and also to determine whether the direction of data is a direction for reading or a direction of writing on the data bus.

The address information is a part of the information which is contained in the addresses of the address/control signal pairs, and stored in the temporary memory means. Row addresses and column addresses which are used for the processes or processors to access the main memory part are contained in the address information. As the control signal timing generation part uses the address information, data at a specified address in the main memory part are accessed.

The bank information is a part of the information which is contained in the addresses of the address/control signal pairs, and stored in the temporary memory means. The bank information describes data which indicate which bank in the main memory part is to be accessed by the processes or processors. As the control signal timing generation part uses the bank information, a bank at which the main memory part is to be accessed is specified.

Now, a description will be given on operations of the order deciding part, the stored order replacing part, the output address generation part and the control signal timing generation part which are disposed in the permutation part. The order deciding part, which determines an order of the address/control signal pairs which are stored in the temporary memory means, replaces an order using the priority rank information, subsequently replaces the order in accordance with differences in row addresses which are contained in the address information, and finally replaces the order in accordance with differences in banks which are contained in the bank information, and the resulting order is stored in the stored order replacing part. Following this, in accordance with the order which is stored in the stored order replacing part, the output address generation part provides the temporary memory means with output addresses for reading out the contents of the temporary memory means. Further, the control signal timing generation part timely accesses the main memory part utilizing the address information, the read/write information and the bank information which are contained in the address/control signal pairs and were read from the temporary memory means.

The temporary memory means may include a write data portion, in addition to an address/control signal portion. The write data portion is used during writing, and the reason for providing the write data portion will be described below. Between a write access and a read access to a DRAM, the timing which requires data is different among various timing of accesses of signals to control. Since data for writing become necessary earlier than data for reading during the period of an access, the write data portion is used to hold the write data once when the address/control signal pairs are written to the temporary memory means.

In such a structure described above, the empty flags, the priority rank information, the addresses, the bank information, the read/write information and the control numbers are information which is necessary in the temporary memory means for the purpose of permutation, and therefore, permutation in accordance with the respective information is possible. Further, since information to be set as the control signals is defined in advance, which portion of the information is necessary for permutation is determined.

Now, permutation in accordance with the respective information will be described. The information which is contained in the address/control signal pairs which are written to the temporary memory means is the empty flags, the priority rank information, the addresses, the bank information, the read/write information and the control numbers. The empty flags are used to indicate that there is a space in the temporary memory means to write in the address/control signal pairs as described above. The order deciding part and the stored order replacing part which are disposed in the permutation part re-arranges accesses from the processes or processors. The information which is contained in the address/control signal pairs is utilized for re-arranging the accesses.

First, the address/control signal pairs corresponding to accesses from the processes or processors are written at storage portions, which are provided to store the address/control signals pairs, in the temporary memory means where the empty flags are not ON. Using the priority rank information among the information which is contained in the written address/control signal pairs, the order deciding part permutes an order of accesses which is stored in the stored order replacing part in such a manner that an address/control signal pair which has the highest priority rank is placed at the top. When there is no such an address/control signal pair, using the address information containing row addresses, the order deciding part permutes the order of access which is stored in the stored order replacing part in such a manner that an address/control signal pair which has the same row address with a currently allowed access is placed at the top. When neither of the former and the latter is found, using the bank information, the order deciding part permutes the order of accesses which is stored in the stored order replacing part in such a manner that an address/control signal pair which has a different bank from the currently allowed access is allowed an access first. The permutation using the bank information is executed only when the main memory part has a multi bank system, but is not performed when the main memory part has a single bank system.

In accordance with the order which is stored in the stored order replacing part, the output address generation part provides the temporary memory means with output addresses for the temporary memory means with which an address/control signal pair can be specified. In response, the temporary memory means provides the control signal timing generation part with the control numbers which are necessary to access the main memory part and specify processes or processors for transfer of data through the data bus, the address information which contains row addresses and column addresses, the bank information which specifies a bank in the main memory part, and the read/write information which indicates whether to read from the main memory part or write in the main memory part, out of the address/control signal pairs.

The control signal timing generation part controls the main memory part. More particularly, first, using the read/write information, the control signal timing generation part specifies whether an access to the main memory part is a read operation or a write operation, provides the data bus with the corresponding timing for the data transfer operation, specifies a bank in the main memory part based on the bank information, and allows a read or write access to the specified bank in accordance with the read/write information. Following this, after extracting a row address from the address information and notifying the main memory part that the row address will be supplied to the main memory part, the row address is supplied to the main memory part. Next, after extracting a column address from the address information and notifying the main memory part that the column address will be supplied to the main memory part, the column address is supplied to the main memory part. This makes it possible to read from or write in the main memory part at a specified bank and address.

In the case of a DRAM, when row addresses are the same, it is possible to access data at a different column address without a time lag of a reset period which is a precharge and a time lag of a period for turning on regions which are connected to the row addresses as described earlier. Meanwhile, when banks are different, it is possible to access without a time lag of a reset period alone as described earlier. Hence, when the address information, the bank information and the like indicating such are supplied to the control signal timing generation part, the main memory part is accessed in such a manner to eliminate a time lag of the nature described above.

DESCRIPTION OF THE PREFERRED EMBODIMENTS

Figure 1:
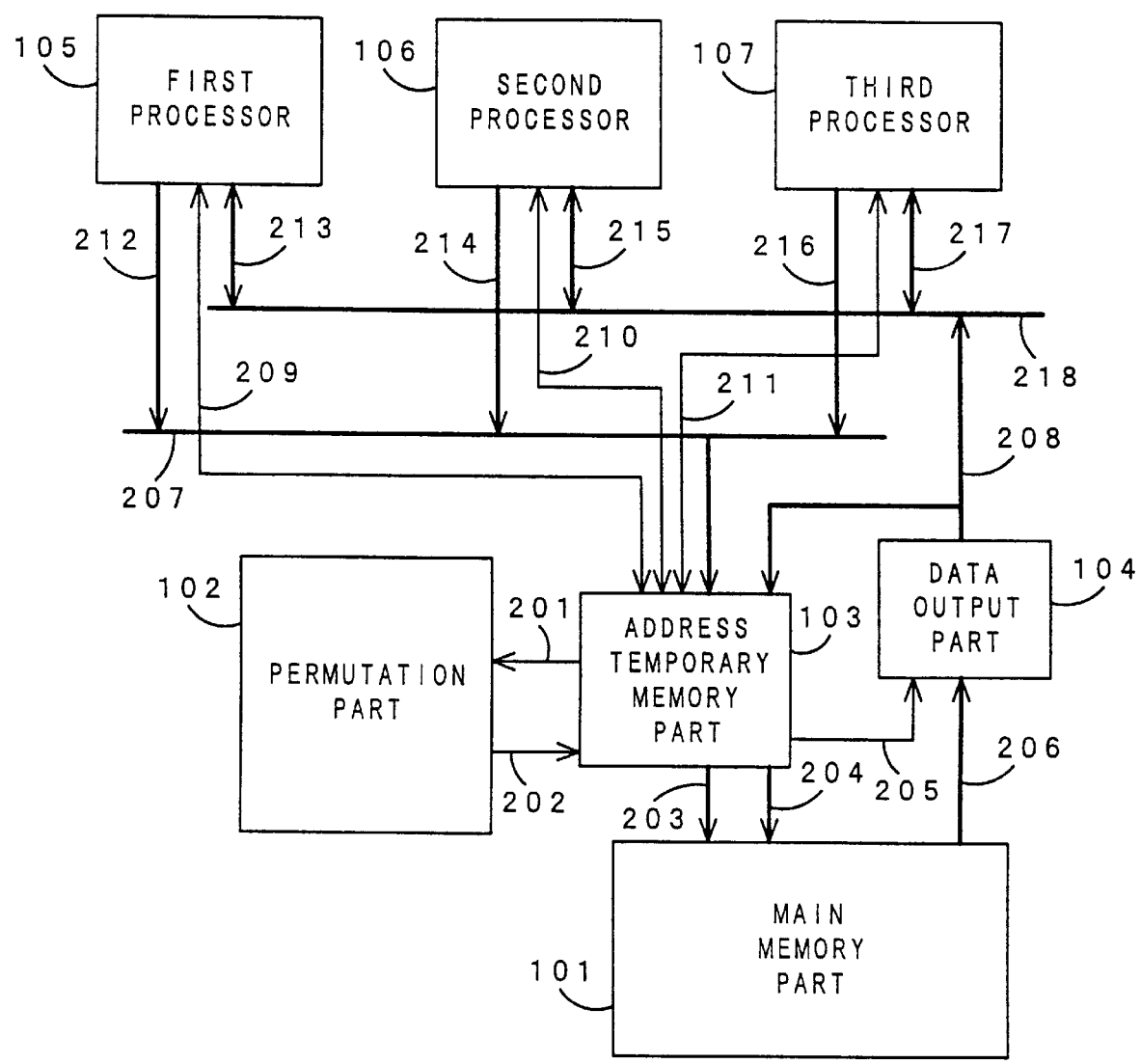
FIG. 1 is a block diagram showing an example of a structure of a multiple address holding memory apparatus according to a preferred embodiment of the present invention.
Figure 2:
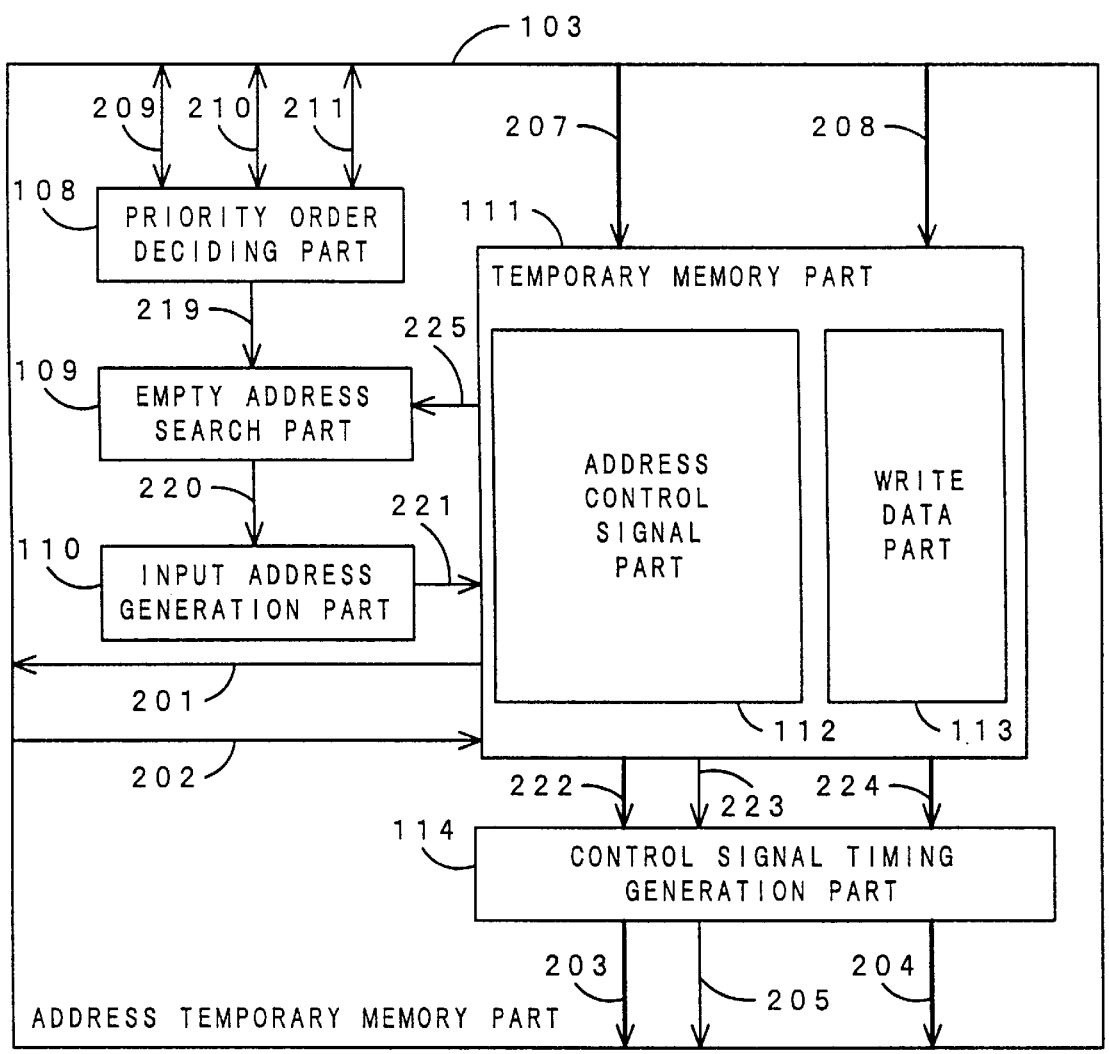
FIG. 2 is a block diagram showing an example of a structure of an address temporary memory part of the multiple address holding memory apparatus according to the preferred embodiment of the present invention.
Figure 3:
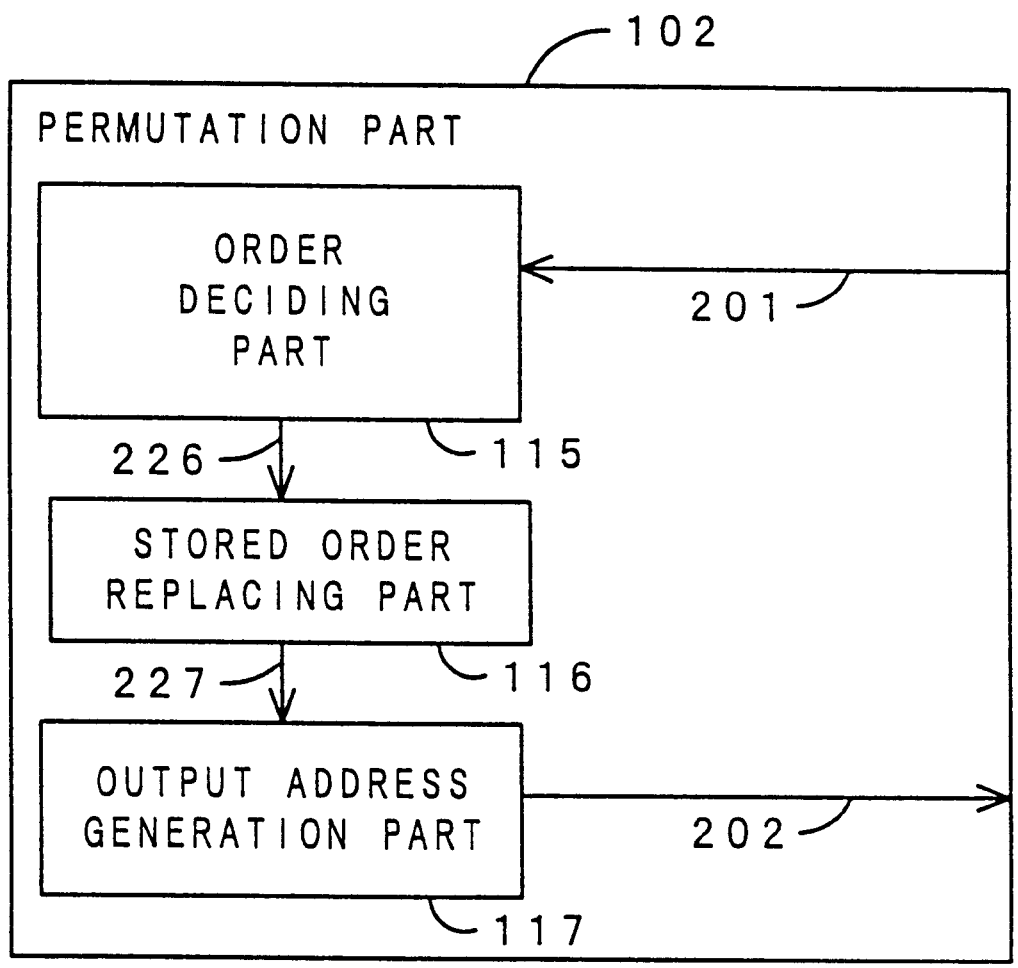
FIG. 3 is a block diagram showing an example of a structure of a permutation part of the multiple address holding memory apparatus according to the preferred embodiment of the present invention.

FIG. 1 is a block diagram showing a multiple address holding memory apparatus according to a preferred embodiment of the present invention, FIG. 2 is a block diagram showing an address temporary memory part of the multiple address holding memory apparatus, and FIG. 3 shows a permutation part of the multiple address holding memory apparatus.

FIGS. 1 through 3, denoted at 101 is a main memory part which holds data which are accessed with the multiple address holding memory apparatus. Denoted at 105 through 107 are a first processor through a third processor. Denoted at 207 is an address bus. Denoted at 218 is a data bus for transferring data with the main memory part 101. Denoted at 103 is the address temporary memory part which temporarily stores address/control signal pairs which to supply to the main memory part 101, which are fed as accesses from the processors 105 through 107 from the main memory part 101, and provides the main memory part 101 with address, bank information and the like so that control signals for reading and writing data are created and control is performed accordingly. Denoted at 102 is the permutation part which permutes an order of the address/control signal pairs which are stored in the address temporary memory part 103, in accordance with the information which is contained in the address/control signal pairs.

Denoted at 104 is a data output part which outputs data which are read from the main memory part 101 to the data bus 218 after adding control numbers to the data.

Now, the control numbers will be described. Since the address bus 207 and the data bus 218 are independent of each other, the control numbers are used as information which specifies accesses from the processors 105 through 107 from the main memory part 101. In this case, one control number is assigned to each access from the processor 105 through 107. The assigned control numbers are included in the address/control signal pairs which are stored in the address temporary memory part 103, as information which is added to the address/control signal pairs which are accessed from the processors 105 through 107. When the address temporary memory part 103 reads from or writes in the main memory part 101, this information of the control numbers is added to thereby specify which one of the processors 105 through 107 on the data bus 218 can access to the data bus 218. This makes it possible for the specified one of the processors 105 through 107 to read or write data on the data bus 218.

Next, a description will be given on a relationship between the control numbers and the respective processors 105 through 107 and operations of the respective processors 105 through 107 based on the control numbers. As the control numbers, the number "105" is assigned to the processor 105, the number "106" is assigned to the processor 106, and the number "107" is assigned to the processor 107, for instance. The address/control signal pairs to which these control numbers are added as a part of the information of the address/control signal pairs are stored in the address temporary memory part 103 through the address bus.

With respect to the information which is contained in the stored address/control signal pairs, as the turn of an access to the main memory part 101 comes and control for reading from or writing in the main memory part 101 is started, it is necessary to read or write data on the data bus 218. At this stage, since the data bus 218 is independent of the address bus 207, it is not possible to specify which one of the processors 105 through 107 is attempting to access. To deal with this, the control numbers are added and the data bus 218 is used. When the data bus 218 is in operation with the control number "105," data are read or written with the processor 105 in accordance with the information which is contained in the stored address/control signal pair, such as read and write, which the processor 105 is attempting to access through the address bus 207. This is similar with where the control number is "106" or "107."

Denoted at 108 is a priority order deciding part which determines priority ranks of accesses to the main memory part 101 from the first processor 105 through the third processor 107. More specifically describing, when the priority rank assigned to the first processor 105 is set the highest and the priority rank assigned to the third processor 107 is set the lowest among the priority ranks which are assigned to the first processor 105 through the third processor 107, for example, the priority order deciding part 108 accepts accesses to the main memory part 101 from the first processor 105 through the third processor 107 in the order of the priority ranks in accordance with the set priority ranks.

Denoted at 111 is temporary memory means which temporarily stores address/control signal pairs in the address temporary memory part 103 which are accessed. The temporary memory means 111 is formed by an address/control signal part 112 for storing addresses and control signals which are extracted from the temporary memory means and a write data part 113 for storing data which are written to the main memory part 101.

The write data part 113 is provided because of the following purpose. That is, the timing which requires data while performing control is different between writing to the main memory part 101 and reading from the main memory part 101. Data are necessary for writing earlier than for reading. In addition, since the processors 105 through 107 do not require data from the main memory part 101 during a write operation, data may be read in advance from the processors 105 through 107. Noting this, during a write operation, write data as well are temporarily stored together with addresses and control signals. The write data part 113 is a portion for storing the write data.

Denoted at 109 is an empty address search part which searches for an empty address in the temporary memory means 111. Now, the empty address search part 109 will be described more specifically. At a region which stores a plurality of address/control signal pairs in the address/control signal part 112 within the temporary memory means 111, each one of addresses which store the address/control signal pairs within the address/control signal part 112 is provided with an empty flag which changes to a high level when an address which is generated by an input address generation part 110 which will be described later is written in through the address bus 207 but changes to a low level when an address which is generated by the input address generation part 110 is read out by a control signal timing generation part 114. An address within the address/control signal part 112 for which the empty flag is at the low level is empty. Signals indicating the empty flags which are assigned to the addresses within the address/control signal part 112 are connected to the empty address search part 109 in such a manner the addresses within the address/control signal part 112 can be specified. Therefore, as the empty address search part 109 searches for the empty flag which is at the low level, it is possible to recognize which address within the address/control signal part 112 is empty.

Denoted at 110 is the input address generation part which generates addresses for the control signals which are supplied to the temporary memory means based on a result of search which is conducted by the empty address search part 109. Denoted at 114 is the control signal timing generation part which timely generates a main memory control signal which causes the main memory part 110 to perform an operation such as read and write. Using the information which is contained in the address/control signal pairs from the temporary memory means 111, the control signal timing generation part 114 generates the main memory control signal to supply to the main memory part 101.

Denoted at 115 is the order deciding part which determines an order for re-arranging the control signals. The order deciding part 115 comprises a CPU which performs comparison. The order deciding part 115 reads out the information of the address/control signal part 112, performs comparison as shown in the flowchart in FIG. 4 using the information with the information of the address/control signal pairs which are currently operated by the main memory part 101, and determines the re-arranging order. Every time the processors 105 through 107 generate accesses and the address/control signal pairs are written to the address/control signal part 112, the order deciding part 115 performs comparison and determines the order. The flowchart in FIG. 4 will be described later.

Denoted at 116 is the stored order replacing part which stores a permuted order. In the stored order replacing part 116, order place numbers are correlated with the address within the address/control signal part 112. The order place numbers can be rewritten by the order deciding part 115. The smallest order place number is outputted to an output address generation part 117, as an address within the address/control signal part 112. The order place numbers are incremented every time one order place number is read out. The output address generation part 117 has a function of causing the temporary memory means 111 to output the address/control signal pairs in an order which is stored in the stored order replacing part 116.

Denoted at 201 is permutation information which is the address/control signal pairs which are stored in the address/control signal part 112 of the temporary memory means 111. Denoted at 202 is an output address which is outputted from the output address generation part 117. Denoted at 203 is a control signal for the main memory part 101, used to perform control, such as read and write, on the main memory part 101, including addresses and the like to the main memory part 101. Denoted at 204 is a write data signal. Denoted at 205 is an output control number which is outputted to the data output part 104 from the address temporary memory part 103. Denoted at 206 is a read data signal which is read from the main memory part 101. Denoted at 208 is a data signal which is supplied to the data bus 218 from the data output part 104 or to the address temporary memory part 103 from the data bus 218.

Denoted at 209 is a first request which demands an access from the first processor 105. Denoted at 210 is a second request which demands an access from the second processor 106. Denoted at 211 is a third request which demands an access from the third processor 107.

Denoted at 212 is a first address/control signal pair which is outputted from the first processor 105. Denoted at 213 is first processor data which are fed to the data bus 218 to perform reading and writing with the first processor 105. Denoted at 214 is a second address/control signal pair which is outputted from the second processor 106. Denoted at 215 is second processor data which are fed to the data bus 218 to perform reading and writing with the second processor 106. Denoted at 216 is a third address/control signal pair which is outputted from the third processor 107. Denoted at 217 is third processor data which are fed to the data bus 218 to perform reading and writing with the third processor 107.

Denoted at 219 is a decision request signal which is outputted to the empty address search part 109 when requests from the processors 105 through 107 to be accepted by the priority order deciding part 108 are determined. Denoted at 220 is an empty address signal which indicates an empty address within the address/control signal part 112 and is outputted to the input address generation part 110 from the empty address search part 109. Denoted at 221 is an input address which indicates addresses within the address/control signal part 112 at which the address/control signal pairs which are outputted to the address bus 207 from the processors 105 through 107 are to be written. Denoted at 222 is control information which consists of the address/control signal pairs read from the address/control signal part 112 and is necessary for the control signal timing generation part 114 to timely generate the main memory control signal which is to be supplied to the main memory part 101. Denoted at 223 is the control numbers which are written with the address/control signal pairs of the address/control signal part 112 to indicate numbers which specify the processors 105 through 107. Denoted at 224 is an original write data signal which is outputted from the write data part 113 which stores write data from the processors 105 through 107 in advance when data are written to the main memory part 101. Denoted at 225 is empty flag information which indicates that the respective addresses corresponding to the address/control signal pairs of the address/control signal part 112 are empty. Denoted at 226 is an order deciding signal which indicates which address/control signal pairs are to be replaced with each other among the order places for accesses which are stored in the address/control signal part 112. Denoted at 227 is an output address deciding signal which indicates addresses within the address/control signal part 112 whose order is determined by the stored order replacing part 116 and which are outputted in the determined order.

Now, a description will be given on a relationship between the request signals 209 through 211 from the plurality of processors 105 through 107 and the priority order deciding part 108 which is disposed in the address temporary memory part 103. It is assumed that the first processor 105, the second processor 106 and the third processor 107 demand accesses to the main memory part 101 simultaneously. The requests are made using the request signals 209, 210 and 211. After outputted, the request signals 209, 210 and 211 are supplied to the priority order deciding part 108 which is disposed in the address temporary memory part 103. If the first processor 105 has the highest priority rank and the third processor 107 has the lowest priority rank, the priority order deciding part 108 accepts the access from the first processor 105, first. The priority order deciding part 108 thereafter notifies the first processor 105 of the acceptance using the request signal 209.

Notified of the acceptance of the request, the first processor 105 outputs an address/control signal pair to the address bus 207. At the same time, the decision request signal 219 is outputted to the empty address search part 109 so that the empty address search part 109 accepts the address/control signal pair from the first processor 105. Receiving the decision request signal 219, the empty address search part 109 recognizes an empty address within the address/control signal part 112 using the empty flag information which indicates an empty address, and outputs the empty address signal which indicates the empty address to the input address generation part 110. At this stage, as the empty flag information, an empty flag may be assigned to each address within the address/control signal part 112. The input address generation part 110 outputs the empty address signal to the address/control signal part 112, as an input address which is a write address to the address/control signal part 112.

When there are simultaneous requests to the main memory part, priority ranks are determined by the priority order deciding part 108 in such a manner that the first processor 105, the second processor 106 and the third processor 107 have progressively lower priority ranks according to this preferred embodiment. However, after supplied to the address temporary memory part 103, the priority ranks are operated by internal priority rank information. As the internal priority ranks, among the information which is written in the address/control signal pairs within the address/control signal part 112 is the priority rank information, and this priority rank information is used. The internal priority ranks may be different from the priority ranks assigned to the processors.

The priority ranks described immediately above are not the priority ranks assigned to the processors, but are priority ranks of accesses from the processors. Hence, in the present invention, an important access is not always limited to a particular processor but is an access whose priority rank needs be high. Where such a method of setting priority ranks is adopted, when an attempted access requires a real time operation as in the case of speech or image information, priority ranks are set among the priority rank information in the address/control signal pairs so that the priority rank of the attempted access becomes high. This makes it possible for the order deciding part 115 of the permutation part 102 to advance the order place of the corresponding address/control signal pair to the top so that the attempted access is allowed first.

The following assumes that priority ranks are the same internally. It is also assumed that the higher eight bits denote a row address and the lower eight bits denote a column address out of a 16-bit address, and that an address can be followed even if a column address is changed as far as row addresses remain unchanged (page access). Banks are constructed in a 2-bank structure of M and N banks. When the bank is different, it is not necessary to precharge and it is possible to continuously access. Further, two clocks are necessary before introduction of a column address is allowed from introduction of a row address, and two clocks are necessary before outputting of data is allowed from introduction of a column address. However, when only a column address is different and a row address is the same, it is possible to continuously access, and four clocks are needed for a precharge. As to a method of displaying an address, 0x at the top is indicative of the hexadecimal number, the following letter M or N denotes a bank, and the remaining indicates an address itself. Permutation of addresses is executed every time the processors 105 through 107 access. In this embodiment, since accesses are attempted as A, B, C and D for every clock, permutation is carried out for every clock.

Further, the address/control signal part 112 stores, as data which are necessary for permutation, the empty flags which are assigned to the respective address/control signal pairs and indicate whether the respective address/control signal pairs are stored in the associated storage portions, the priority rank information which indicates the priority ranks, the address information which indicates the addresses, the bank information which indicates the banks, the read/write information which indicates read or write, and control number information which indicates the control numbers. Such information is stored in the address/control signal part 112 in the following manner. More precisely, the processors 105 through 107 create the priority rank information in such a manner that a priority rank becomes high when an access which requires a real time operation is attempted but becomes low when demanded data are rarely used and therefore can wait. The processors 105 through 107 create the address information, the bank information and the read/write information for performing a read access or a write access to data at a particular bank and a particular address in the main memory part 101, and store the address information, the bank information and the read/write information in the address/control signal part 112 together with the priority rank information. At this stage, the address/control signal part 112 adds the control numbers, with which the processors 105 through 107 are specified, to the information and stores the information as the address/control signal pairs.

The read/write information is not used to control permutation itself. However, when the main memory control signal is generated to the main memory part 101, the timing at which data become necessary is different and as the direction of the data reverses depending on whether data in the main memory part 101 are to be read or data are to be written in the main memory part 101, and therefore, the read/write information as well is included in the address/control signal pairs. The control number information is not used for permutation itself. Since the control number information is used to specify data accesses from the processors 105 through 107 on the data bus 208, the control number information is also included in the address/control signal pairs.

Operations with such specifications above will be described in the following.

Figure 5:
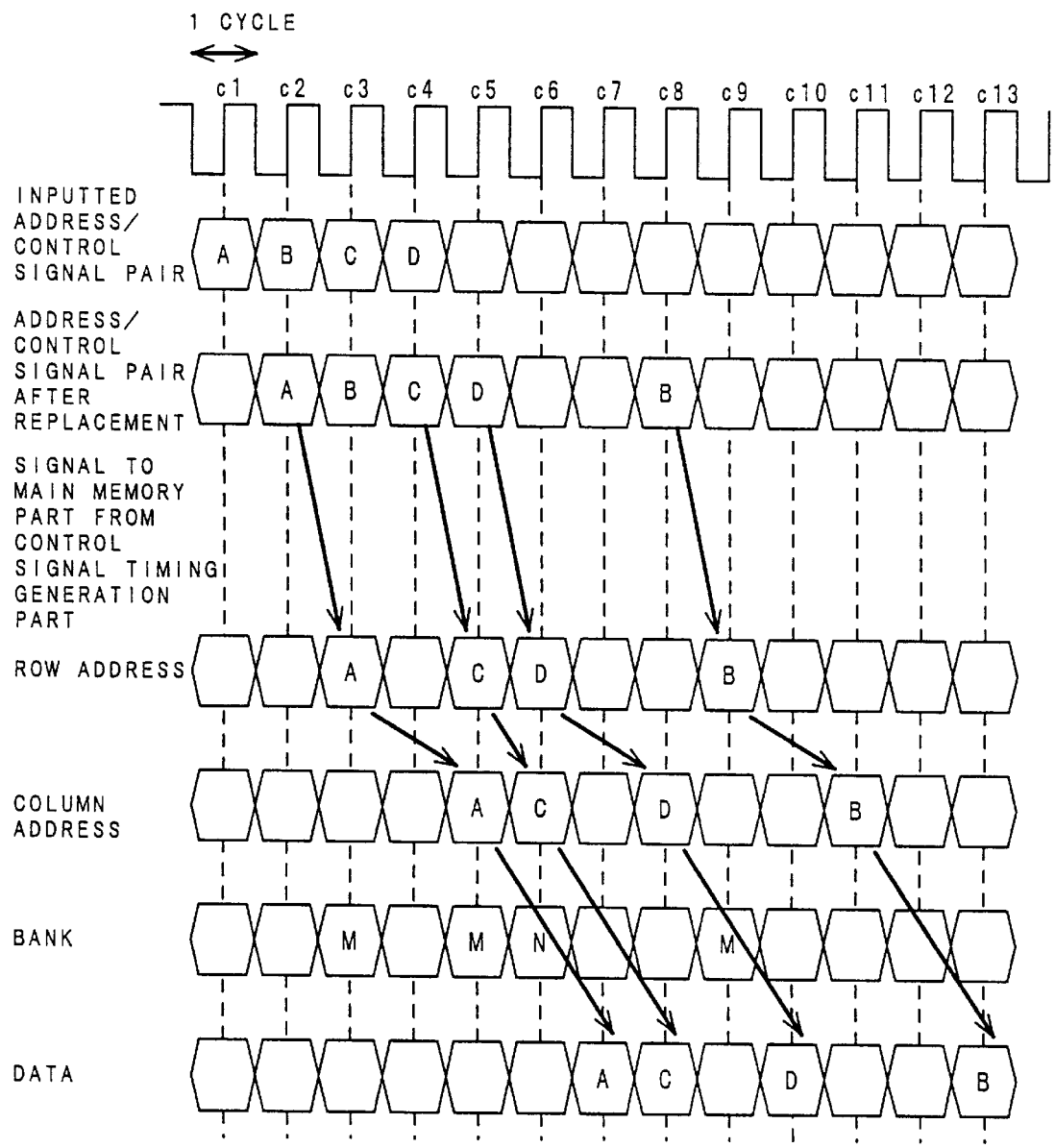
FIG. 5 is a timing chart showing an operation during an access with permutation performed.

The following is directed to an operation in which first processor 105 reads data at an address 0xM0000 in the main memory part 101, the second processor 106 reads data at an address 0xM1200 in the main memory part 101, the third processor 107 reads data at an address 0xM0080 in the main memory part 101, and the first processor 105 then reads data at an address 0xNA000 in the main memory part 101. That is, in terms of requests, the initial requests from the first to the third processor occur at the same time, and after two clocks, the first processor makes another request. FIG. 5 shows the timing chart. In FIG. 5, denoted at A is the first request from the first processor, denoted at B is the first request from the second processor, denoted at C is the first request from the third processor, and denoted at D is the second request from the first processor.

Figure 4:
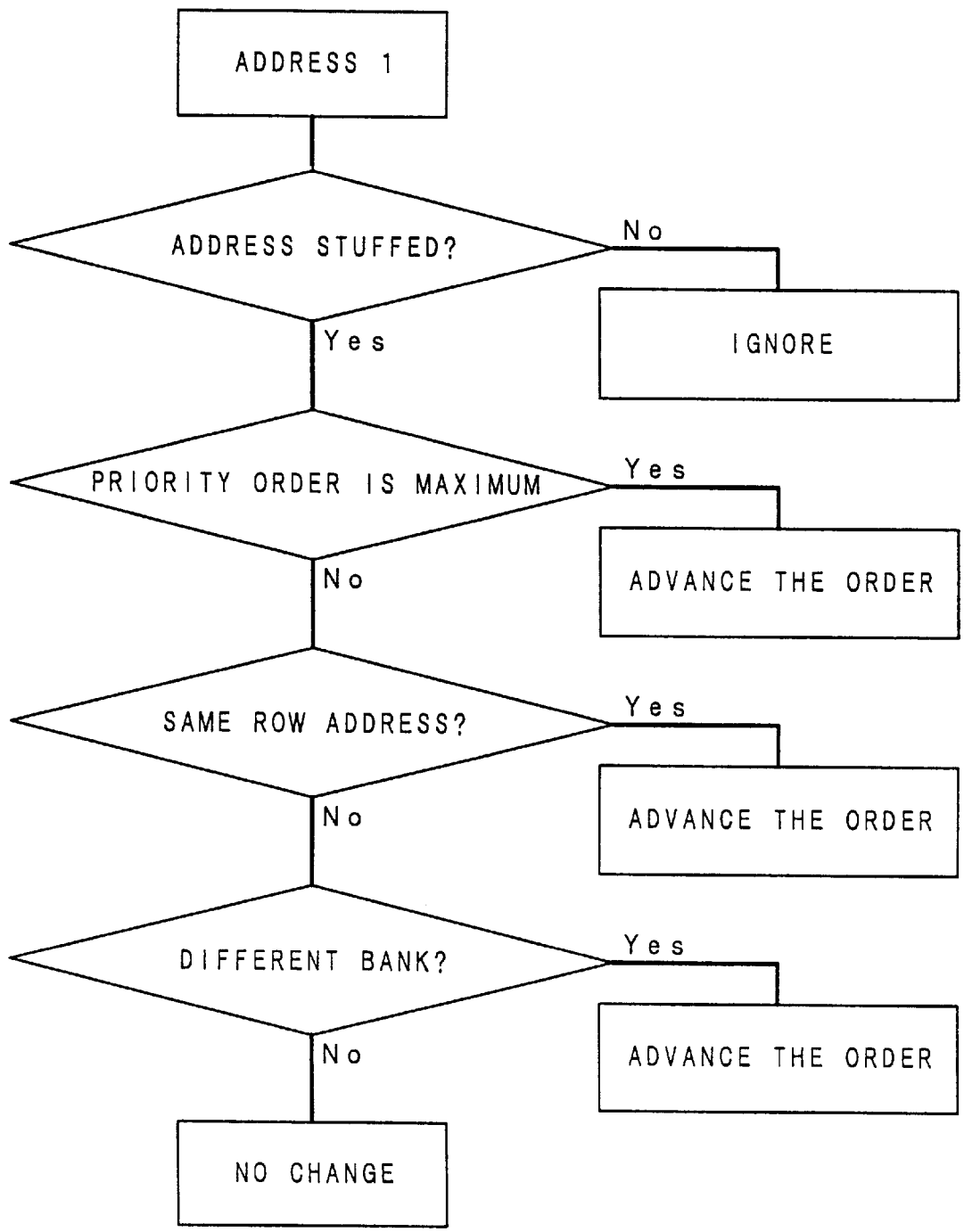
FIG. 4 is a flowchart of an order deciding part as it performs permutation.

The address/control signal pairs are arranged and determined in the priority order deciding part 108, with those for the first processor earlier and those for the third processor later. Using the empty flags stored in the address/control signal part 112, the empty address search part 109 searches for empty addresses in the temporary memory means 111, and notifies the input address generation part 110 of the empty addresses in the order of the requests in accordance with the priority ranks. Based on addresses which are generated by the input address generation part 110, the address/control signal pairs are stored in the address/control signal part 112. The stored address/control signal pairs are supplied to the permutation part 102 as the permutation information 201 and permuted. The permutation part 102 has the structure shown in FIG. 3, and the order deciding part 115 determines an order. FIG. 4 shows, as a flowchart, how the order deciding part 115 determines an order. ADDRESS 1 in the flowchart is an address at which an address/control signal pair is stored in the address temporary memory part 103. The order deciding part 115 confirms whether the ADDRESS 1 is stuffed, in accordance with the empty flags which are stored in the address/control signal part 112. If the ADDRESS 1 is not stuffed, there is nothing at the ADDRESS 1, and therefore, the order deciding part 115 ignores the ADDRESS 1. However, if the ADDRESS 1 is stuffed, the order deciding part 115 checks whether the priority rank is maximum. As it is assumed here that the priority ranks are the same, the order deciding part 115 checks whether the row address is the same without advancing the order. Since the accesses for A and C have the same bank and the same row address (0xM0000 and 0xM0080) and the access for A is already started at the time of the initial determination of the priority order, the order is advanced such that the access C is allowed instead of the access for B.

This is followed by judgement of whether the bank is different. Since there is the access for D which has a different bank (D is at 0xNA000), the access for C is followed by the access D. In this manner, the accesses are allowed in the order of A, C, D and B. A multiple address holding memory apparatus which has a single bank system is different in not performing comparison of banks in a flowchart which is necessary when multiple banks are to be used. The structures where the respective parts are connected to each other remain the same.

Figure 6:
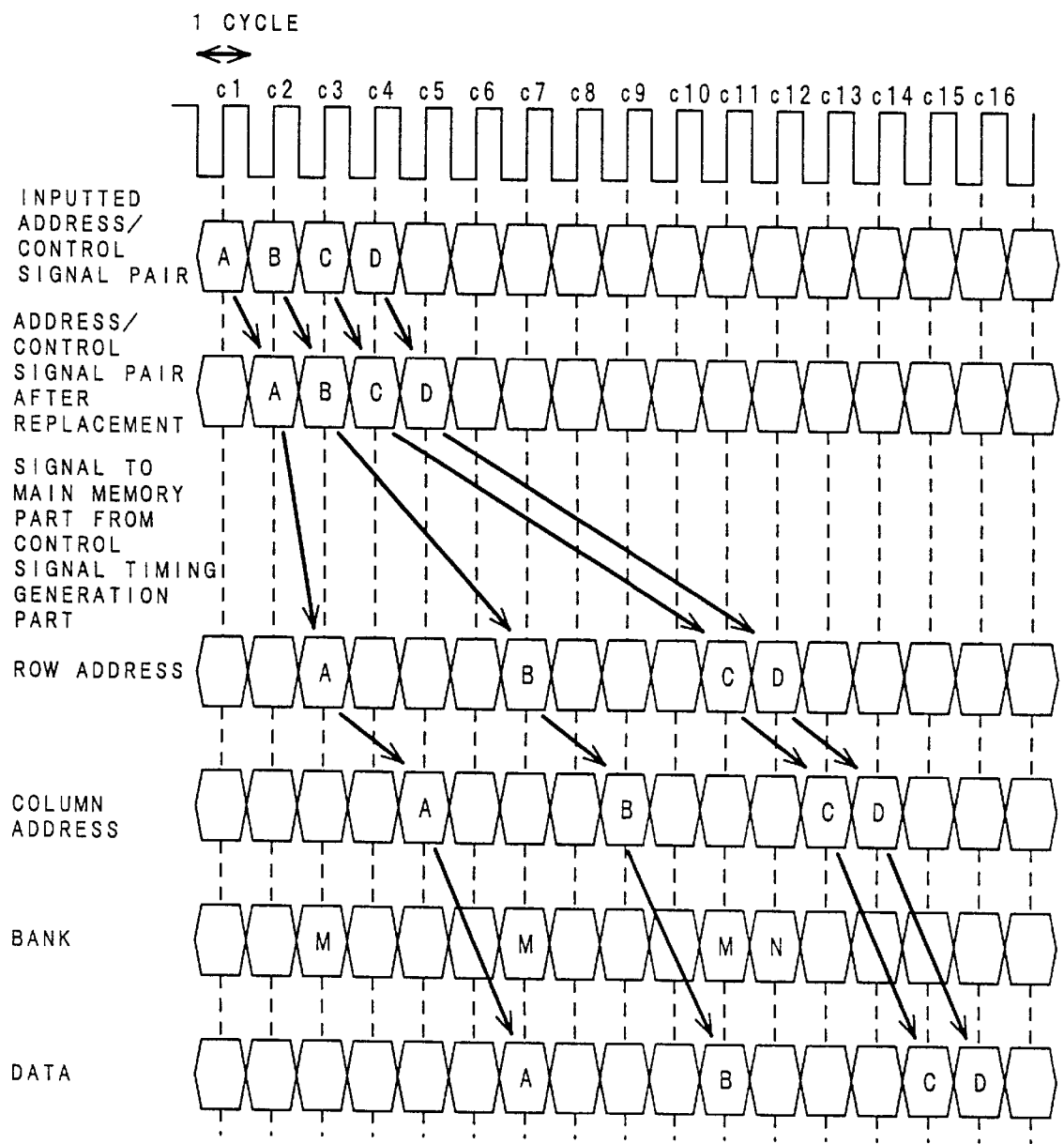
FIG. 6 is a timing chart showing an operation during an access without permutation performed.

This retrieves data for the request B which is read at last in eleven clocks in total after the row address is fed to the main memory part 101. On the other hand, since the requests A and B have the same bank but different row addresses, if accesses are allowed in the order of A, B, C and D as is normally performed, as shown in FIG. 6, four clocks are necessary for a precharge period and further four clocks of a precharge period is necessary when an access is allowed in response to the request C. Thus, thirteen clocks are necessary from the initial introduction of the row address of the request A until data for the request D are read out. Hence, an access time is shorter two clocks in the present invention than in the conventional technique.

Now, a supplemental description will be given on the timing chart in FIG. 5. The address/control signal pairs which are supplied to the temporary memory means 111 are fed to the control signal timing generation part 114 in the next cycle. Since the order deciding part 115 determines permutation of the address/control signal pairs when the address/control signal pairs are fed to the control signal timing generation part 114, the signal associated with the request A is outputted as is originally planned in the next cycle and the signal associated with the request B is outputted according to the permutation in the following cycle. However, when the control signal timing generation part 114 accesses the main memory part 101, since the request B has the different row address, the access is not accepted for two cycles. During this, the request C with the same row address comes. Since the stored order replacing part 116 has not accepted the access for B yet, the access for C is started first.

Next, a case that a read operation and a write operation mix with other will be briefly described. During a write operation, at the same time that the processors 105 through 107 attempt to access on the address bus 207, using the data bus 218, write data are written to the write data part 113 of the temporary memory means 111 so as to correspond to the address/control signal pairs. Further, at the same time that the address/control signal pairs are read to the control signal timing generation part 114 from the temporary memory means 111, the write data as well are read to the control signal timing generation part 114. The control signal timing generation part 114 thereafter outputs the main memory control signal and the write data signal to the main memory part 101, using the address/control signal pairs and the write data.

What is claimed is:

1. A multiple address holding memory apparatus which is shared by a plurality of processes or a plurality of processors and which transfers data with said plurality of processes or said plurality of processors, said apparatus comprising:

a main memory part having an address input terminal;

an address bus for inputting addresses which are used for accessing said main memory part from said plurality of processes or said plurality of processors in accordance with a first order, and for inputting control signals which control said main memory part;

a data bus for transferring data between said plurality of processes or said plurality of processors and said main memory part;

an address temporary part which is disposed at said address input terminal of said main memory part, said address temporary memory part holding a plurality of addresses which are inputted through said address bus and a plurality of control signals which correspond to said plurality of addresses, and said address temporary memory part supplying said addresses which are held therein to said main memory part while supplying said control signals to said main memory part; and a permutation part which permutes said plurality of addresses held in said address temporary memory part into a second order which realizes high-speed accessing of said main memory part regardless of said first order in which addresses are input in said address temporary memory part for accessing said main memory part, said address temporary memory part supplying said addresses and said control signals to said main memory part sequentially in accordance with said second order, wherein said second order gives higher priority to permutation in accordance with priority ranks of accesses than to permutation in accordance with an order which realizes high-speed accessing.

2. The multiple address holding memory apparatus of claim 1, wherein the order which realized high-speed accessing is an order in which accesses to addresses having identical row addresses are continuous to each other.

3. The multiple address holding memory apparatus of claim 1, wherein said main memory part has a multi bank system, and the order which realizes high-speed accessing is an order in which accesses to addresses of different banks are continuous to each other.

4. The multiple address holding memory apparatus according to claim 1, wherein a priority rank of access for a particular pair comprising an address and a control signal stored in said temporary memory part is incremented each time said particular pair comprising an address and a control signal is passed over for access to said main memory part.

5. A multiple address holding memory apparatus which is shared by a plurality of processes or a plurality of processors and which transfers data with said plurality of processes or said plurality of processors, said apparatus comprising:

a main memory part having an address input terminal;

an address bus for inputting addresses which are used for accessing said main memory part from said plurality of processes or said plurality of processors in accordance with a first order, and for inputting control signals which control said main memory part;

a data bus for transferring data between said plurality of processes or said plurality of processors and said main memory part;

an address temporary memory part which is disposed at said address input terminal of said main memory part, said address temporary memory part holding a plurality of addresses which are inputted through said address bus and a plurality of control signals which correspond to said plurality of addresses, and said address temporary memory part supplying said addresses which are held therein to said main memory part while supplying said control signals to said main memory part; and a permutation part which permutes said plurality of addresses held in said address temporary memory part into a second order which realizes high-speed accessing of said main memory part regardless of said first order in which addresses are input in said address temporary memory part for accessing said main memory part, said address temporary memory part supplying said addresses and said control signals to said main memory part in accordance with said second order, wherein said address temporary memory part includes:

temporary memory means for temporarily storing addresses for accessing said main memory part and control signals;

a priority order deciding part for deciding priority ranks of said plurality of processes or said plurality of processors, accepting said addresses for accessing said main memory part and said control signals in the order of said priority ranks, and outputting a decision request signal upon acceptance of said addresses for accessing said main memory part and said control signals;

an empty address search part for searching for empty addresses in said temporary memory means in response to said decision request signal, said empty addresses being for temporarily storing said addresses for accessing said main memory part and said control signals;

an input address generation part for supplying said empty addresses found in said temporary memory means to said temporary memory mens as input addresses for writing data, based on a result of search which is performed by said empty address search part; and a control signal timing generation part for supplying an output signal from said temporary memory means to said main memory part at proper timing for accessing said main memory part, and said permutation part includes:

an order deciding part for deciding an order of addresses in said temporary memory means based on information of said addresses and said control signals which are stored at the respective addresses in said temporary memory means;

a stored order replacing part for storing an order which is decided by said order deciding part; and an output address generation part for providing said temporary memory means with output addresses for reading data, in accordance with contents which are stored in said stored order replacing part.

6. The multiple address holding memory apparatus of claim 5, wherein said information of said addresses and said control signals which are stored at the respective addresses in said temporary memory means includes:

empty flags which indicate that there are empty addresses in said temporary memory means; and address information which indicates addresses at which said main memory part is to be accessed, said empty address search part searches for empty addresses in said temporary memory means based on said empty flags, and said order deciding part decides an order of said addresses in said temporary memory means based on said address information.

7. The multiple address holding memory apparatus of claim 5, wherein said main memory part has a multi bank system, said information of said addresses and said control signals which are stored at the respective addresses in said temporary memory means includes:

empty flags which indicate that there are empty addresses in said temporary memory means;

address information which indicates addresses at which said main memory part is to be accessed; and bank information which indicates banks at which said main memory part is to be accessed, said empty address search part searches for empty addresses in said temporary memory means based on said empty flags, and said order deciding part decides an order of said addresses in said temporary memory means based on said address information and said bank information.

8. A multiple address holding memory which is shared by a plurality of processes or a plurality of processors and which transfers data with said plurality of processes or said plurality of processors, said apparatus comprising:

a main memory part having an address input terminal;

an address bus for inputting addresses which are used for accessing said main memory part from said plurality of processes or said plurality of processors in accordance with a first order, and for inputting control signals which control said main memory part;

a data bus for transferring data between said plurality of processes or said plurality of processors and said main memory part;

an address temporary memory part which is disposed at said address input terminal of said main memory part, said address temporary memory part holding a plurality of addresses which are inputted through said address bus and a plurality of control signals which correspond to said plurality of addresses, and said address temporary memory part supplying said addresses which are held therein to said main memory part while supplying said control signals to said main memory part; and a permutation part which permutes said plurality of addresses held in said address temporary memory part into a second order which realizes high-speed accessing of said main memory part regardless of said first order in which addresses are input in said address temporary memory part for accessing said main memory part, said address temporary memory part supplying said addresses and said control signals to said main memory part in accordance with said second order, wherein said second order gives higher priority to permutation in accordance with priority ranks of accesses than to permutation in accordance with an order which realizes high-speed accessing, wherein said address temporary memory part includes:

temporary memory means for temporarily storing addresses for accessing said main memory part and control signals;

a priority order deciding part for deciding priority ranks of said plurality of processes or said plurality of processors, accepting said addresses for accessing said main memory part and said control signals in the order of said priority ranks, and outputting a decision request signal upon acceptance of said addresses for accessing said main memory part and said control signals;

an empty address search part for searching for empty addresses in said temporary memory means in response to said decision request signal, said empty addresses being for temporarily storing said addresses for accessing said main memory part and said control signals;

an input address generation part for supplying said empty addresses found in said temporary memory means to said temporary memory means as input addresses for writing data, based on a result of search which is performed by said empty address search part; and a control signal timing generation part for supplying an output signal from said temporary memory means to said main memory part at proper timing for accessing said main memory part, and said permutation part includes:

an order deciding part for deciding an order of addresses in said temporary memory means based on information of said addresses and said control signals which are stored at the respective addresses in said temporary memory means;

a stored order replacing part for storing an order which is decided by said order deciding part; and an output address generation part for providing said temporary memory means with output addresses for reading data, in accordance with contents which are stored in said stored order replacing part.

9. The multiple address holding memory apparatus of claim 8, wherein said information of said addresses and said control signals which are stored at the respective addresses in said temporary memory means includes:

priority rank information which indicates priority ranks of accesses;

empty flags which indicate that there are empty addresses in said temporary memory means; and address information which indicates addresses at which said main memory part is to be accessed, said empty address search part searches for empty addresses in said temporary memory means based on said empty flags, and said order deciding part decides an order of said addresses in said temporary memory means based on said priority rank information and said address information.

10. The multiple address holding memory apparatus of claim 8, wherein said main memory part has a multi bank system, said information of said addresses and said control signals which are stored at the respective addresses in said temporary memory means includes;

priority rank information which indicates priority ranks of accesses;

empty flags which indicate that there are empty addresses in said temporary memory means;

address information which indicates addresses at which said main memory part is to be accessed; and bank information which indicates banks at which said main memory part is to be accessed, said empty address search part searches for empty addresses in said temporary memory means based on said empty flags, and said order deciding part decides an order of said addresses in said temporary memory means based on said priority rank information, said address information and said bank information.

\* \* \* \* \*